United States Patent
Sumsion et al.

(10) Patent No.: US 6,496,865 B1
(45) Date of Patent: Dec. 17, 2002

(54) SYSTEM AND METHOD FOR PROVIDING INTERPRETER APPLICATIONS ACCESS TO SERVER RESOURCES IN A DISTRIBUTED NETWORK

(75) Inventors: John G. Sumsion, Spanish Fork, UT (US); Grant G. Echols, Payson, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 08/815,544

(22) Filed: Mar. 12, 1997

(51) Int. Cl.[7] .............................. G06F 15/16; G06F 9/46
(52) U.S. Cl. .................... 709/229; 709/315; 709/203; 709/225; 717/139; 717/163; 717/165; 717/166
(58) Field of Search ................................ 709/229, 330, 709/203, 319, 315, 219, 218, 217, 331, 225, 316, 328, 329, 310, 314; 707/10, 103; 717/5, 7, 108, 116, 136, 139, 162, 163, 164, 165, 166, 107; 713/167, 2

(56) References Cited

U.S. PATENT DOCUMENTS

| | | | | |
|---|---|---|---|---|
| 5,566,302 A | * | 10/1996 | Khalidi et al. ............... 709/201 |
| 5,724,588 A | * | 3/1998 | Hill et al. .................... 709/328 |
| 5,734,907 A | * | 3/1998 | Jarossay et al. ............. 717/114 |
| 5,740,370 A | * | 4/1998 | Battersby .................... 709/219 |
| 5,778,228 A | * | 7/1998 | Wei ............................ 709/219 |
| 5,778,356 A | * | 7/1998 | Heiny .......................... 707/2 |
| 5,790,425 A | * | 8/1998 | Wagle ......................... 709/218 |
| 5,793,965 A | * | 8/1998 | Vanderbilt et al. ........... 709/201 |
| 5,802,373 A | * | 9/1998 | Yates et al. ................... 717/5 |
| 5,818,448 A | * | 10/1998 | Katiyar ........................ 345/744 |
| 5,875,332 A | * | 2/1999 | Wang et al. .................. 717/2 |
| 5,881,230 A | * | 3/1999 | Christensen et al. ......... 709/203 |
| 5,893,116 A | * | 4/1999 | Simmonds et al. .......... 707/201 |
| 5,893,118 A | * | 4/1999 | Sondergger .................. 707/203 |
| 5,950,008 A | * | 9/1999 | van Hoff ...................... 709/201 |
| 5,961,582 A | * | 10/1999 | Gaines ......................... 709/1 |
| 5,961,610 A | * | 10/1999 | Kelly et al. .................. 709/318 |
| 5,983,019 A | * | 11/1999 | Davidson ..................... 717/5 |
| 6,006,229 A | * | 12/1999 | Schmide et al. .............. 707/10 |
| 6,009,464 A | * | 12/1999 | Hamilton et al. ............ 709/219 |
| 6,052,670 A | * | 4/2000 | Johnson ....................... 705/27 |
| 6,052,732 A | * | 4/2000 | Gosling ....................... 709/229 |
| 6,157,961 A | * | 12/2000 | Kessler et al. .............. 709/315 |
| 6,167,458 A | * | 12/2000 | Lim et al. .................... 709/330 |
| 6,219,668 B1 | * | 4/2001 | Arnaud et al. ................ 707/10 |
| 6,282,580 B1 | * | 8/2001 | Chang ......................... 709/316 |

* cited by examiner

Primary Examiner—Mark H. Rinehart
Assistant Examiner—William C. Vaughn, Jr.
(74) Attorney, Agent, or Firm—Dinsmore & Shohl LLP

(57) ABSTRACT

A resource access system and method for providing interpreters with the ability to provide interpreter applications access to any desired server resource regardless of type of server and current capability of the client node to access such server resources. The invention is an application-level extension of the interpreter, enabling the interpreter to provide server resource access independently of the type of operating system implemented in the client node. In addition, the invention utilizes existing techniques to communicate with the server, such as a distributed object system or an existing client redirector, enabling the invention to provide such access with minimal modifications to the client or server nodes, accommodating the client node's current capability to access the server resources. Also, the resource access system provides access without having to use a foreign application interface.

15 Claims, 9 Drawing Sheets

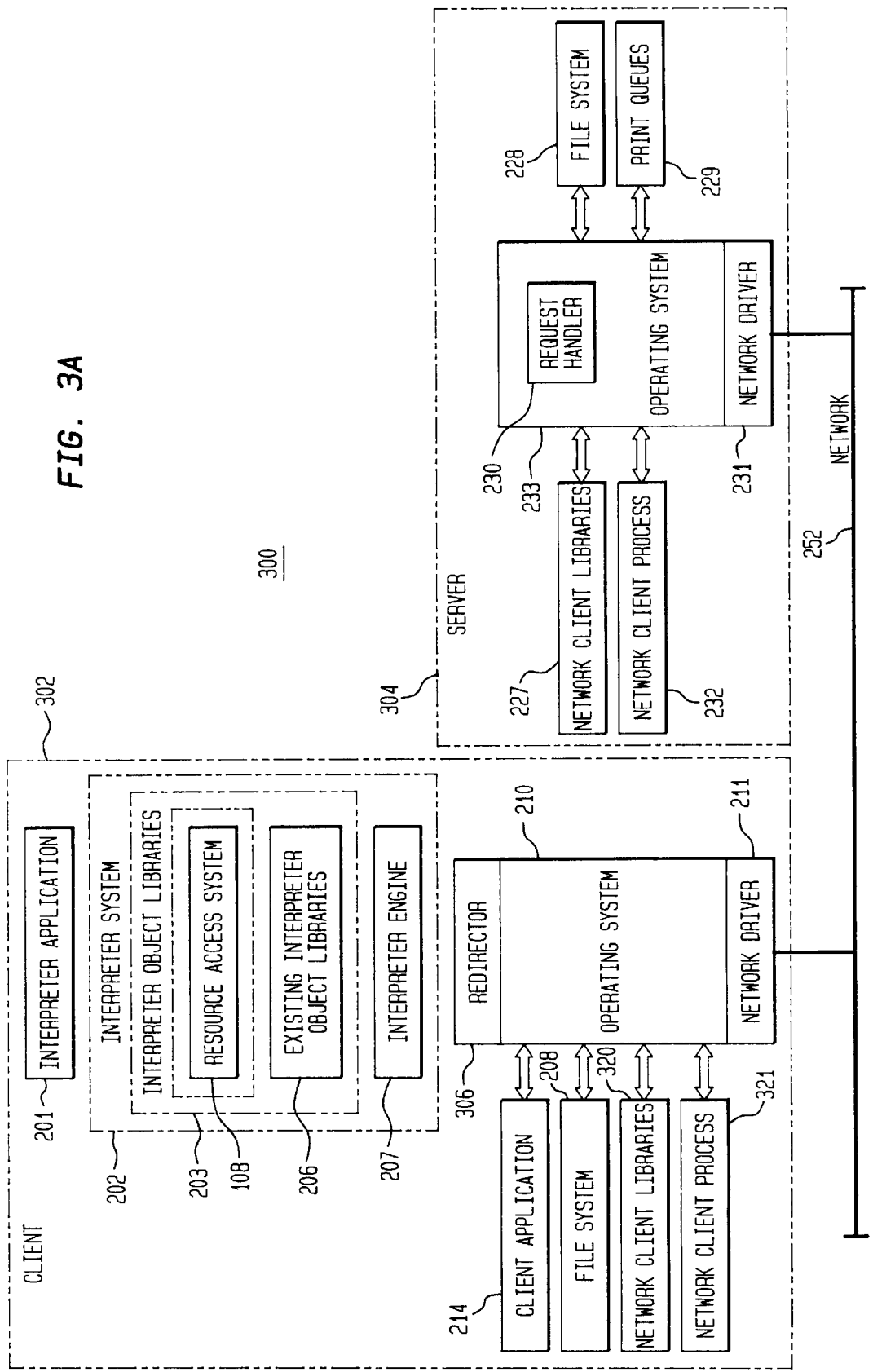

SYSTEM AND METHOD FOR PROVIDING INTERPRETER APPLICATIONS ACCESS TO SERVER RESOURCES IN A DISTRIBUTED NETWORK

BACKGROUND OF THE INVENTION

1. Field of the Invention

The present invention relates generally to accessing network server resources and, more particularly, to a system and method for providing interpreter applications access to server resources in a distributed network.

2. Related Art

Internetworking is the process of establishing and maintaining communications and transferring data among multiple nodes in a distributed network system. The nodes are connected by a common communication medium such as copper or fiber optic cabling and may have a series of intermediate active nodes, such as routers or bridges. The nodes communicate with each other using a common information exchange protocol, such as IPX or TCP/IP.

The purpose of an internetwork is to provide end-to-end service between a client node and a server node to share resources such as information stored in files, databases, etc.; print, facsimile, CD-ROM and other services; and other resources located locally and remotely relative to the server. The client and server nodes are generally computers such as workstations and PCs.

The client node typically includes application programs that request access to resources located on the server node. The server node, which may be, for example, a NetWare® server available from Novell, Incorporated or a Windows NT® server available from Microsoft Corporation, is typically a computer dedicated to providing access to the above resources in response to requests generated by the client nodes. (NetWare is a registered trademark of Novell, Inc., and Windows NT is a registered trademark of Microsoft Corp.)

When the client application makes a request, the request is intercepted by a redirector in the client node and passed either to the local operating system or to network client libraries and a network client process for transmission to the server node. The network client libraries translate the request parameters from the library environment to a format appropriate for the network client process. The network client process places the request parameters into a network packet and invokes a network driver on the client node. The network driver packages the request and forwards it onto the network using an appropriate packet format and media-access method. The request is received by a corresponding network driver on the server node that provides the request to a request handler in the server. The request handler, which is typically part of the server operating system, performs the necessary operations to process the request. The resulting reply is returned to the client node in a similar manner.

It is well known that different versions of an application program are generally required to enable it to operate with different types of operating systems. For example, WordPerfect® for Windows 95™ will not function on the Windows™ 3.1 operating system. (WordPerfect is a registered trademark of Corel, Inc., Windows 95 is a trademark and Windows is a registered trademark of Microsoft Corp.) To enable a single version of an application to execute on different types of operating systems, programs providing a standard application program interface (API) have been recently developed. These programs, referred to as interpreter programs or simply interpreters, operate at a functional level above the client or server operating system. The interpreter program, referred to hereinafter as an interpreter system, executes application programs written in the language of the interpreter system. These applications are referred to hereinafter as interpreter applications. The interpreter system isolates the interpreter applications from the particular requirements of each type of operating system.

An interpreter system generally includes an interpreter engine and interpreter libraries. The interpreter engine translates interpreter applications to system-level instructions appropriate for the host (client or server) operating system. Unlike a compiler which converts programs written in a higher level language (source code) to system-level instructions (object code) for subsequent execution by the processor, the interpreter engine executes source code by translating interpreter commands directly into processor instructions and executing these instructions on the processor. The interpreter libraries define the API that performs functions such as input/output, networking and utility functions utilized by the interpreter applications to access client and server resources. Examples of interpreter systems include the Java Virtual Machine™ (Java™) and the associated Java Development Kit (JDK) available from Sun Microsystems, ActiveX™ available from Microsoft Corporation, and the widely available Smalitalk interpreter, which executes instructions written in the Smalltalk programming language. (Java Virtual Machine and Java are trademarks of Sun Microsystems, Inc. and ActiveX is a trademark of Microsoft Corp.)

Generally, the interpreter libraries are implemented in an object-oriented programming language and are generally referred to as object or class libraries. The interpreter libraries include a number of service libraries. Two of these service libraries which are of particular importance to the present invention are the commonly known network service libraries and the input/output (I/O) service libraries. The I/O service libraries provide the interpreter application with the ability to access local resources on the client node. For example, the I/O service libraries include objects for reading and writing to a file. The technique which is used by these objects is based upon the concept of a stream. A stream is a sequence of data, such as strings or arrays of bytes or other objects, transferred over a period of time from/to a desired resource. In particular, these I/O libraries include a generic "stream" object class whose methods could be extended to operate on a structure such as a file. For example, when an interpreter application accesses a local file on a client node, stream objects enable the interpreter application to perform file operations such as reading and writing a stream of data to/from the local file. In Java, generic stream objects are extended by file stream objects which use the same programming interface. Other stream objects are used by an interpreter application to operate on a local file.

Network service libraries provide the interpreter application with the ability to access server resources using an application-level communications protocol. Also, interpreters such as Java often include what is commonly referred to as distributed objects, which allow an interpreter system of a first node to transfer a request directly to an interpreter system on a second node for processing. When implementing distributed objects, the interpreter system transfers a request from the interpreter application to distributed objects on the first node which then transfers the request to distributed objects on the second node. The distributed objects on the server node execute the request as if the request was generated locally and returns a reply to the requesting distributed objects on the client node. The requesting distributed objects provide the interpreter application with the reply as if it was generated locally. Different types of distributed object systems exist, such as CORBA, RMI, and DCOM.

Although interpreter systems provide a standardized API, the I/O service libraries do not include objects that support the file access methods necessary to access a particular class of server nodes that require access to occur through an installable file system (IFS). As is well known, an installable file system is an interface found on client operating systems which allows network vendors to provide access to file systems which would normally be foreign to the client operating system. Servers that support communication with an IFS on a client node include, for example, NetWare, Windows NT and Network File System (NFS) servers.

A conventional approach for providing interpreter applications access to resources on servers is to include a software device referred to as a redirector. As noted, a redirector on the client node receives I/O requests from the interpreter and directs the requests either to the local operating system or to the server node. However, for the redirector to direct the resource requests to the client operating system, it must use the programming interface associated with the client operating system. As a result, a different type of redirector is required to support each type of client operating system. For example, commonly available redirectors include Client-32 available from Novell, Inc. for the Windows 95 operating system, NetWare Requester™, also available from Novell, Inc., for the Windows NT operating system, and the Network File System created by Sun Microsystems for the Unix® operating system. (NetWare Requester is a trademark of Novell, Inc. Unix is a registered trademark, licensed exclusively through X/Open Company, Ltd.) To include a redirector in each client node requires the system developer to incur significant costs associated with the development and maintenance of the different types of redirectors on the numerous, currently existing client operating systems.

Another approach has been to include the functionality that enables the interpreter applications to communicate with the servers within the interpreter object libraries. However, interpreters currently provide limited network service libraries, thereby limiting the type of servers and features that the interpreter applications can use. For example, the network service libraries generally included in Java interpreters only provide the objects necessary to communicate using a network-level protocol such as the TCP/IP information exchange protocol. Java network service libraries do not provide, for example, the objects necessary to use application level protocols with servers such as NetWare, NT, etc. These application level services are generally assumed to be provided by a client redirector. Thus, on clients without redirectors, access to such services is not possible.

What is needed, therefore, is a means for providing interpreter applications with the ability to access a broad range of server resources, regardless of the type of server, without incurring the expense of developing and installing a redirector on existing client nodes. It is also desirable to implement such functionality with minimal modifications to the client and server nodes so that such resource access may be achieved in an efficient and cost effective manner. In addition, it is desirable to provide such functionality without having to use a foreign application programming interface.

SUMMARY OF THE INVENTION

The present invention relates to a resource access system and method for providing interpreter applications access to any desired server resource regardless of type of server and current capability of the client node to access such server resources. The invention is an application-level extension of the interpreter system, that locates and accesses a server resource using existing server methods to provide the interpreter application access to a server resource. Also, the invention provides access independent of the type of operating system implemented in the client node by providing access to the server resource at a functional level above the operating system. In addition, the invention utilizes existing techniques, such as distributed objects or an existing client redirector, to communicate with the server. Thus, the invention provides such access to resources on the server node with minimal modifications to either the client or server nodes.

One embodiment of the present invention is implemented when the client node does not include the proper functionality, such as a redirector, to access server resources. Such a redirector would use existing server resource location and access methods defined on the server node to access a server resource. In this embodiment, commonly available distributed object systems are available on both the client and server node. In addition, a stub and a proxy of the resource access system is installed on the client and server node, respectively. The resource access system on each node is associated with an interpreter system on that node. Resource access requests generated by the interpreter application on the client node are received by the resource access system stub on the client node and directly forwarded to the resource access system proxy on the server node using distributed objects. The resource access request is received by a distributed object on the server and forwarded to the server resource access system proxy which then forwards the request to a request handler in the server's operating system for processing. A reply is generated, and is transferred by a distributed object on the server to a distributed object on the client. The resource access request is processed by the distributed objects on the client and server nodes as if the request was processed on the client node. For example, the invention may be implemented with a Java Virtual Machine ("Java") interpreter on both the client and server nodes to enable Java applications located on the client node to access resources on a Novell NetWare™ server node. Also, the invention may be implemented with distributed object systems such as Common Object Request Broker Architecture (CORBA), Java Remote Method Invocation (RMI), or Distributed Common Object Model (DCOM).

Advantageously, this arrangement provides server resource access to client interpreter applications without having to install a redirector in the client node. This eliminates the costs associated with creating and maintaining a client redirector for each of the various client operating systems. Importantly, therefore, the client node does not need to be modified in any way other than to install the present invention on the client node for use with the client interpreter.

Another embodiment of the present invention is implemented when the client node includes the proper functionality, such as a redirector, for accessing resources on the server node. In this embodiment, the resource access system is installed only on the client node. Resource access requests from the interpreter application are received by the resource access system and translated into requests for the client redirector. The redirector transfers the request to network client libraries on the client node which then forwards the request to the server. The server node then processes the request in a normal manner. For example, the present invention may be implemented with a Java interpreter on a NetWare client node to enable Java interpreter applications on that node to access NetWare server resources. Advantageously, in this arrangement where the client node includes a redirector, the server node does not have to be modified in any way to enable the interpreter applications to have access to server resources.

Specifically, the resource access system includes a resource locator that obtains location information necessary to access the desired server resource using existing server resource location methods. In response to an interpreter application's resource request, a resource accessor of the invention accesses the desired server resource as necessary to satisfy the request based on the information provided by the resource locator using existing server resource access methods.

The interpreter system generally includes object libraries to provide a standard application program interface (API) with the interpreter applications. The resource access system is implemented as object-oriented libraries which can be substituted for existing object-oriented libraries. The resource locator includes locator objects which obtain location information for the resource using existing server resource location methods. The resource accessor is comprised of streaming objects that access the server resource using the location information provided by resource locator objects using existing server resource access methods. Preferably, the resource access system objects inherit from the existing interpreter libraries.

Significantly, the resource access system extends the functionality of the existing interpreter libraries, supplementing the standard application programming interface (API) provided by the interpreter. By inheriting from the existing objects, the resource access system objects can be substituted for existing objects for the purpose of accessing server resources. As noted, these server resources may be, for example, a file system or print queue located on the server node.

Significantly, the resource access system provides the interpreter system with the enhanced capability to provide interpreter applications access to server resources. Advantageously, the resource access system enables interpreter applications to use server resources that were not originally designed to access such resources (such as Java applications using NetWare server resources) without custom programming, thereby greatly reducing the cost and effort required to support such applications.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral s first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 3A is a functional block diagram of an interpreter client node and a network server node incorporating a second embodiment of the present invention to enable the interpreter applications to access server resources;

DETAILED DESCRIPTION

The following invention will be more completely understood through the following detailed description which should be read in conjunction with the attached drawings in which similar reference numbers indicate similar structures.

Figure 1:
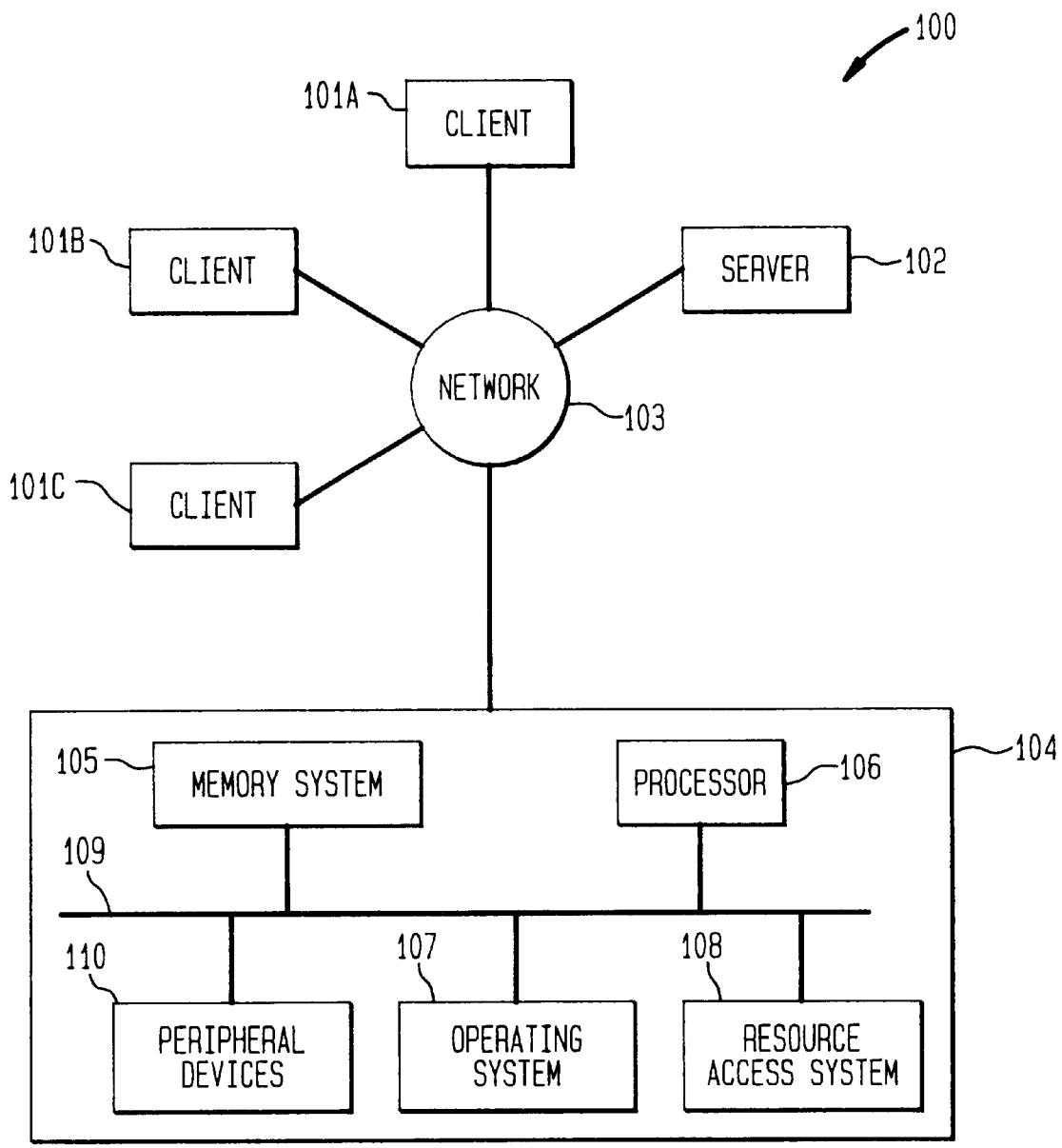
FIG. 1 is an exemplary network system wherein the resource access system of the present invention may be implemented.

An exemplary network system environment 100 in which the resource access system of the present invention may be implemented is illustrated in FIG. 1. The network system 100 includes a server node 102 and a plurality of client nodes 101A–101C and 104, each of which contains one or more interpreter applications that access resources on the server node 102 over network 103 using any available network communication protocol. The resource access system 108 of the present invention resides in client nodes 101A–101C, 104 and/or server node 102, and is associated with interpreters in those nodes, managing access to the server resource as described below.

An exemplary computer system 104 implementing the resource access system of the present invention is shown in FIG. 1 as node 104. Computer system 104 may be a general purpose computer system and may operate as a client and/or server node as described below. The general purpose computer system 104 typically includes a processor 106 connected to a memory system 105 via an interconnection means such as bus 109. Input/output devices such as disk controllers, graphics cards, or the like, may be included in the computer system 104. The computer system 104 hosts an operating system 107 and is programmable using a high level computer programming language.

The general purpose computer system 104 includes a commercially available processor 106 such as the Pentium microprocessor from Intel Corporation, PowerPC microprocessor, SPARC processor, PA-RISC processor or 68000 series microprocessor. Many other processors are also available. Such a processor usually executes the operating system 107 which may be, for example, the DOS, Windows 95, or Windows NT operating systems from the Microsoft Corporation, the System 7 operating system from Apple Computer, the Solaris operating system from Sun Microsystems, the Unix operating system available from many vendors such as Sun Microsystems, Inc., Hewlett- Packard and AT&T, or the NetWare operating system available from Novell, Inc.

The operating system controls the execution of other computer programs and provides scheduling, debugging, input-output control, accounting compilation, storage assignment, data management, memory management, and communication control and related services. The processor and operating system define a computer platform for which application programs in high level programming languages are written. The server node 102 and client nodes 101A–101C, 104 may be any type of computer system as described above, with a network interface card (NIC) or other communication device installed to communicate over the network 103. Other network management software may also be included as is well known in the art.

The operating system 107 interfaces with firmware and hardware in a well-known manner to access peripheral devices 110 and memory system 105. Memory system 105 may be any commonly available random access memory (RAM) or read-only memory (ROM), such a resident hard drive, CD ROM, tape system, etc.

The resource access system 108 of the present invention is preferably implemented in an interpreted object-oriented programming language, such as Java, ActiveX or Smalltalk. The resource access system 108 is capable of residing on any well-known computing platform 104. The software techniques for performing server resource access functions in accordance with the present invention typically reside in memory 105 and may be stored on a computer-readable medium such as, for example, magnetic disk, compact disk or magnetic tape. The software embodiment of the present invention may be loaded into the computer system 100, server 102 or client node 104 using an appropriate peripheral device 110, as known in the art. It should be understood, however, that the present invention is not limited to a particular computer platform, particular operating system or particular processor. The exemplary environments identified above are given by way of example only; the invention may be implemented in a variety of computer systems having a variety of system architectures. It is noted that the present invention is well-suited for enabling interpreter systems such as Java provide interpreter applications access to resources associated with servers such as NetWare servers.

Figure 2A:
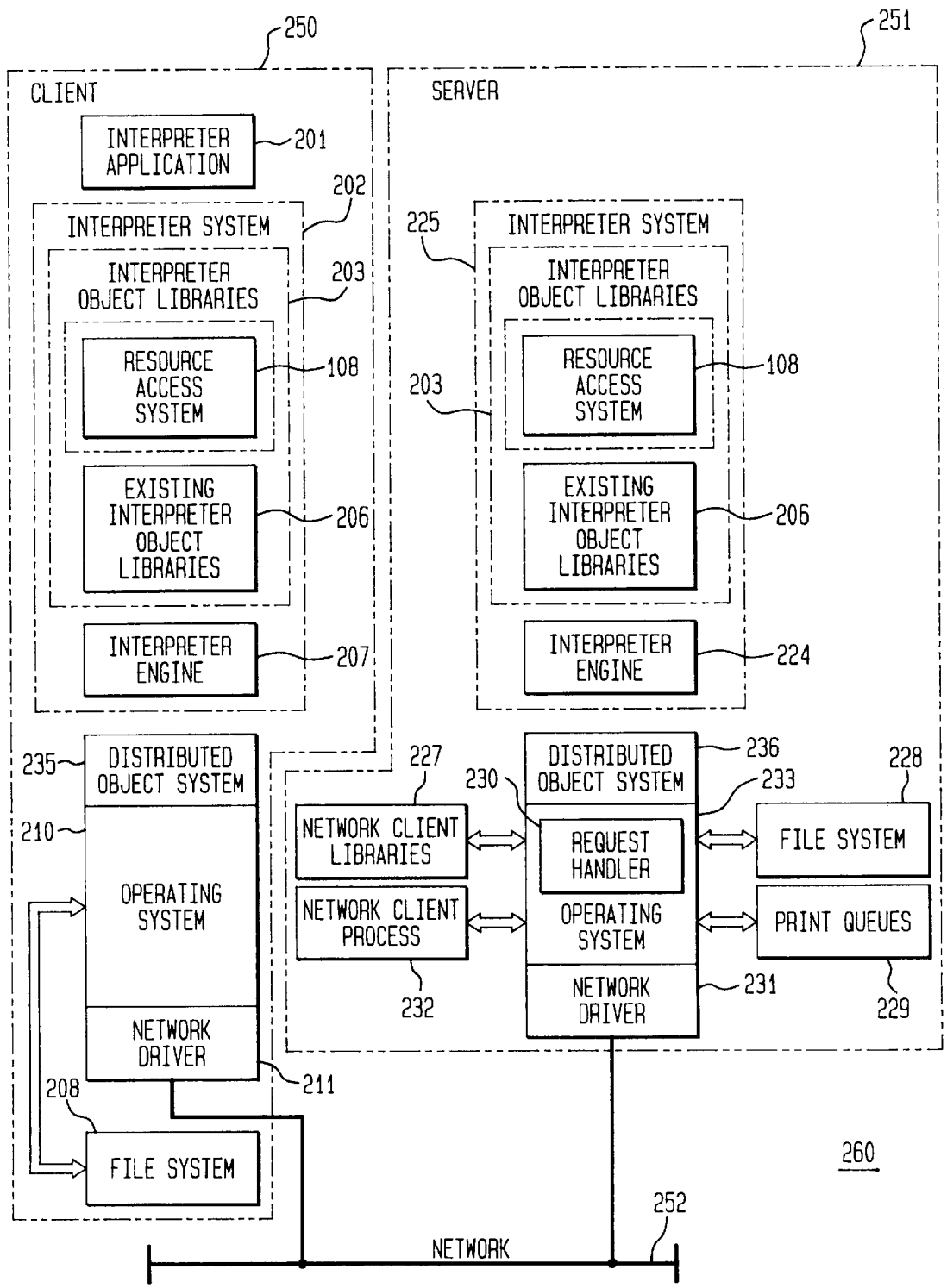
FIG. 2A is a functional block diagram of an interpreter client node and a network server node incorporating one embodiment of the present invention to enable the interpreter applications to access server resources.

FIG. 2A is a block diagram of one embodiment of the resource access system 108 of the present invention implemented in an exemplary network system 260. The network system 260 includes a client node 250 and a sever node 251 communicably coupled through network 252. The client node 250 includes at least one interpreter application 201 that generates requests to access resources such as file system 228 and print queue 229 on the server node 251.

The client node 250 includes an interpreter system. 202 configured to include the resource access system 108 in accordance with the present invention. The interpreter system 202 operates at a functional level above client operating system 210, executing interpreter application 201 and isolating the interpreter application 201 from the particular requirements of the operating system 210.

The interpreter system 202 includes an interpreter engine 207 and interpreter object libraries 203. The interpreter engine 207 translates interpreter application 201 to system-level instructions appropriate for the client operating system 210. The interpreter object libraries 203 are referenced by the interpreter application 201 which are executed by the interpreter engine 207 as is known in the art. The interpreter object libraries 206 define the application program interface (API) and, as is commonly known, are used to create the interpreter application 201. In the embodiment illustrated in FIG. 2A, the resource access system 108 is preferably included in the interpreter object libraries 206 with the existing interpreter object libraries 203.

The existing interpreter object libraries 206 typically include objects for accessing the client node's local file system 208 and specific, limited network server resources as described below. The interpreter engine 207 and existing interpreter object libraries 206 may be any commonly available object-oriented interpreter engine and libraries. For example, in the illustrative embodiment, the interpreter engine 207 and existing interpreter object libraries 206 may be implemented in the currently available Java programming language available from Sun Microsystems. However, as those skilled in the relevant art would find apparent, other interpreter languages such as ActiveX or Smalltalk may be used.

Other components of the client node 250 pertinent to the present invention include network driver 211 and distributed objects 235. These components enable processes on the client node to communicate with other nodes coupled to the network 252. In addition to accessing the local file system 208, the interpreter application 201 may access the server resource through the communication protocols supported by the existing interpreter object libraries 206 that utilize the network driver 211 and distributed objects 235. For example, the network service libraries in the Java existing interpreter object libraries 206 only provide objects that support communications using the well-known TCP/IP network-level protocol.

Existing Java network service libraries do not include objects that support the resource access methods necessary to access the server node 251. In a conventional client node, a redirector, network client process, and network client libraries would be required to access a server resource. Server node 251 may be, for example, a NetWare™ server available from Novell, Incorporated or a Windows NT server available from Microsoft Corporation. Distributed objects 235, 236 may be, for example, Common Object Request Broker Architecture (CORBA) available from the Object Management Group (OMG), Remote Method Invocation (RMI) available from Sun Microsystems, or the Distributed Component Object Model (DCOM) available from Microsoft.

Also, in the illustrative example shown in FIG. 2A, the client node 250 does not include the necessary functionality, such as a redirector, network client process, and network client libraries, for communicating with the server node 251. As noted, a redirector on the client node would receive I/O requests from the interpreter 201 and direct the requests either to the local operating system 210 or to the server node 251 via a network client process and network client libraries. Thus, a redirector, network client process, and network client libraries, would therefore provide the interpreter application 201 with the ability to access resources on the server node 251.

To enable the interpreter system 202 to provide the interpreter application 201 with the ability to access resources on the server 251, the interpreter system 202 includes the resource access system 108 of the present invention. The resource access system 108 enables the interpreter system 202 to provide interpreter application 201 access to any desired server resource regardless of type of server and current capability of the client node to access such server resources; that is, without a redirector.

Preferably, the resource access system 108 is provided as an extension to the existing interpreter object libraries 206; that is, the resource access system 108 may be invoked by existing interpreter objects in libraries 206 or by the interpreter engine 207. In addition, it is preferable that the resource access system 108 be developed in the same computer programming language as the interpreter system 202. Thus, in the illustrative embodiment wherein the interpreter engine 207 is written in the Java programming language, then the resource access system 108 is preferably implemented as objects according to the Java programming language and incorporated into the interpreter object libraries 203. Specifically, the resource access system 108 is preferably implemented as object libraries which supplement the existing interpreter I/O libraries 206.

In the embodiment shown in FIG. 2A, a resource access system 108 is installed on the client node 250 and a resource access system 108 is installed in the server node 251 with the resource access system objects. During runtime, however, the resource access system 108 operates as a stub, and the server resource access system 108 operates as a proxy. The proxy typically performs well-known operations on behalf of the stub in client-server systems. Hereinafter, the client resource access system and server resource access system are referred to as the resource access system stub and the resource access system proxy, respectively. Also, the client node 250 and server node 251 include distributed object technology 235, 236. As will be explained in detail below, the resource access system stub and proxy communicate with each other to provide the interpreter application 201 with the capability to access resources on the server node 251 through distributed objects.

Resource access requests generated by the interpreter application 201 on the client node 250 are received by the client resource access system stub 108 and forwarded to the resource access system proxy 108 using commonly available distributed object technology. The resource access system proxy 108 then forwards the request to a request handler 230 in the server's operating system which then processes the request. Thus, the resource access system enables the interpreter system to provide server resource access independently of the type of operating system implemented in the client node. In addition, by utilizing existing distributed object technology to communicate between the resource access system stub 108 and proxy 108, the present invention provides such access without having to install a redirector on the client node 250. This enables the present invention to accommodate the client node's current capability to access the server resources and minimizes the amount of modifications that have to be made to the client and server nodes.

It should also be noted that the resource access systems 108 can be downloaded and installed automatically through the network 252 without user intervention from, a node that is accessible using a communication protocol supported by the libraries 203. Alternatively, the objects included in the resource access system stub 108 that are referenced by the interpreter application 201 can be individually included in the interpreter application 201 itself and then downloaded through the network 252 in a well-known manner.

Figure 2B:
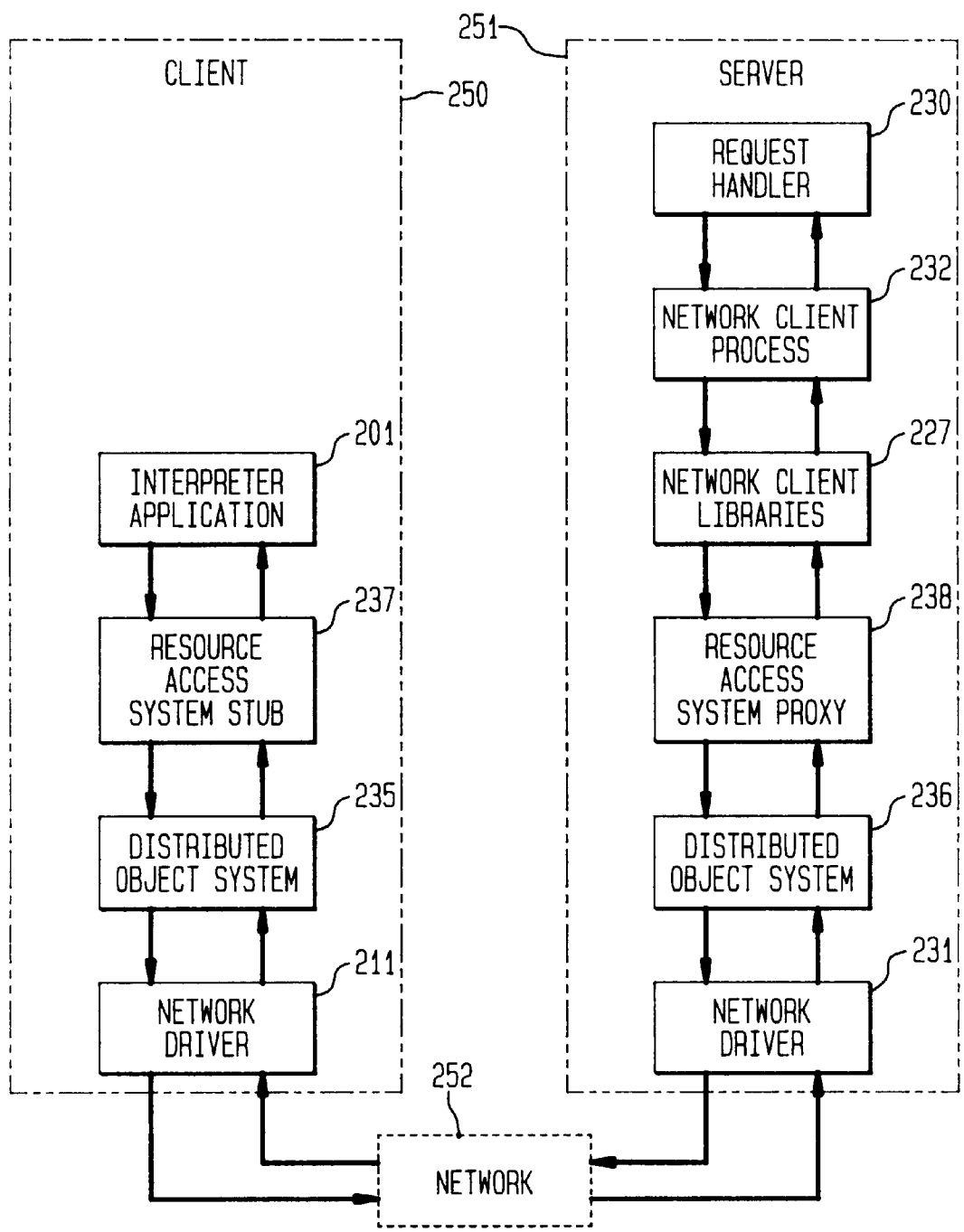
FIG. 2B is a communications flow diagram illustrating the functions performed and the information transferred among the network elements illustrated in FIG. 2A.

FIG. 2B is a block diagram illustrating the communication flow which occurs between the interpreter application 201 and request handler 230 utilizing the embodiment of the resource access system stub 237 and proxy 238 illustrated in FIG. 2A. As noted, the interpreter application 201 is preferably written in the programming language of the interpreter system 202 and includes references to functions within the resource access system stub 237. The request handler 230 is part of the server operating system 233 and operates with the operating system 233 to access the requested server resources.

Referring to FIG. 2B, when a request is made, the interpreter application 201 invokes objects in the resource access system stub 237 on the client node 250. In accordance with the present invention, the resource access system stub 237 use commonly available distributed object 235 to transfer the request to the remote interpreter object libraries proxy 238 on the server node 251.

Distributed objects 235 on the client node transfer the request to the network driver 211. The network driver adds control information to the request and transfers the control and request information to the network driver 231 on the server node 251 using an information exchange protocol such as IPX or TCP/IP over the network 252.

The network driver 231 on the server node 251 receives the control and request information and dispatches the request to distributed objects 236 on the server node 251. The distributed objects 236 pass the request to the resource access system proxy 238 which execute the request on behalf of the interpreter application 201 on the client node 250 as if the request was processed locally.

The resource access system proxy 238 invokes the network client libraries 227 on the server node 251. The network client libraries 227 translate parameters from the language of the interpreter system 225 to a language supported by the operating system 233 on the server node 251. In the example given above, the network client libraries 227 translate the request parameters from the Java to C programming language. The network client libraries 227 also translate parameters from the library environment to the network client process 232 through a call gate, device IOCTL, system interface or other well-known form as specified by the server operating system 233 on the server node 251. The network client libraries 227 may be, for example, NetWare Loadable Modules (NLM), a static link library or DLL, all of which are considered to be well known in the art.

The server network client process 232 invokes the request handler 230 in the server operating system 227 to access the desired server resource and the request handler 230 returns a reply to the network client process 232. The network client process 232 translates the reply parameters from the environment of the network client process 232 to that of the libraries 227. The network client libraries 227 translate the returned parameters into the interpreter language (C to Java in the above example) and returns the reply information to the resource access system proxy 238 on the server node 251. In accordance with the present invention, the resource access system proxy 238 on the server node 251 uses distributed objects to return parameters to the resource access system stub 237 on the client node 250 through the same network path. The resource access system stub 237 returns control to the calling interpreter application 201 with the reply information furnished by the server 251. The remote processing of the request is performed transparently to the interpreter application 201.

FIG. 3A is a block diagram of a second embodiment of the resource access system 108 of the present invention implemented in an exemplary network system 300. The network system 300 includes a client node 302 and a sever node 304 communicably coupled through network 252. As in the first embodiment, the client node 302 includes at least one interpreter application 201 that requests access to resources such as file system 228 and print queue 229 on the server node 304. However, unlike client node 250, the client node 302 includes a redirector 306, network client process 232, and network client libraries 227 for accessing resources on the server node. The remainder of the elements illustrated in FIG. 3A are analogous to those illustrated in FIG. 2A, and are referred to with the same reference numeral.

In order to utilize the existing capabilities of client nodes to access server resources, the resource access system 108 is installed only on the client node 302 and not on the server node 304, and utilizes the redirector 306 to access the server resources. In accordance with the present invention, the resource access system 108 translates resource access requests generated by the interpreter application 201 into requests for the client redirector 306. The redirector 306 is a conventional redirector, formatting the request for communication between the client and the server nodes, and forwards the request to the server node 304 using the network client process 321 and network client libraries 320. The server node 304 also processes such a request in a known manner. As a result, the server node 304 does not have to be modified in any way to enable the interpreter application 201 to have access to server resources.

Figure 3B:
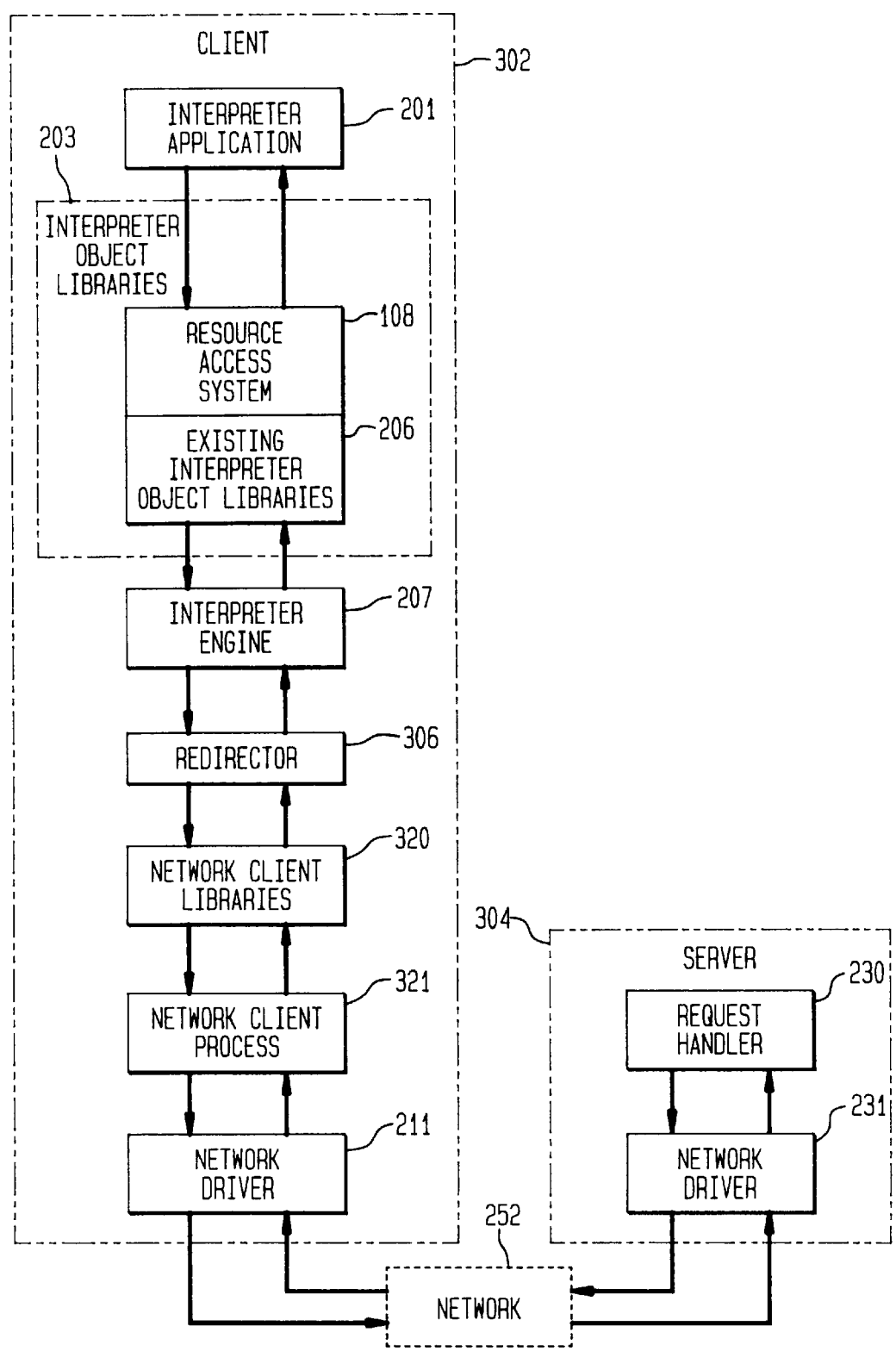
FIG. 3B is a communications flow diagram illustrating the functions performed and the information transferred among the network elements illustrated in FIG. 3A.

FIG. 3B is a block diagram illustrating the communication flow which occurs between the interpreter application 201 and request handler 230 utilizing the embodiment of the resource access system 108 illustrated in FIG. 3A. In a preferred embodiment wherein the interpreter application 201 is written in the programming language of the interpreter system 202 and includes references to functions within the resource access system 108. In this embodiment, the interpreter application 201 invokes objects in the resource access system 108 on the client node 302. These objects are extensions of existing interpreter object libraries 206 and thus, can be substituted for existing interpreter objects 206.

In accordance with the present invention, the resource access system objects 108 invoke functions in the currently existing redirector 306 through the interpreter engine 207. The interpreter engine 207 translates requests made by the resource access system objects 108 to requests for the redirector. The redirector 306 then calls a function in the network client libraries 320 corresponding to the request made by the interpreter engine 207.

The network client libraries 320 translate parameters from the library environment to that of the network client process 321 through a call gate, device IOCTL, system interface or other well-known form as specified by the client operating system 210. The network client libraries 320 may be, for example, NetWare Loadable Modules (NLM), a static link library or DLL.

The network client process 320 places the parameters into a packet appropriate for the network driver 211, and invokes the driver 211. The client network driver 211 adds control information to the parameters and transfers the control and request information to the network driver 231 on the server node 304 using an information exchange protocol such as IPX or TCP/IP over the network 232. In the above example wherein the client is a NetWare client, the network client process 321 places the parameters into a NetWare Core Protocol (NCP) packet and the driver 211 adds NCP control information to the request and transfers the information.

The network driver 231 on the server node 304 receives the control and request information and dispatches the request to a request handler 230 in the server operating system 233 to access the desired server resource and return a reply to the network client process 321. The server operating system 233 processes the request and generates a reply that is returned to the network driver 231. The network driver 231 sends the reply to the network driver 211 on the client node 302 through the network 252. The network driver 211 strips off control information from the reply, and returns the reply information to the network client process 321.

The network client process 321 returns the reply information to the redirector 306 through the network client libraries 209 that translates the reply parameters from the environment of the network client process 321 to that of the libraries 320. The network client libraries 320 return the reply information to the redirector 306 in the programming language of the redirector 306 and client operating system 210.

The redirector 306 returns the reply information to the interpreter engine 207 on the client node 302, which then transfers the reply information to the resource access system objects 108. In accordance with the present invention, the resource access system objects 108 on the client node 302 return the reply to the interpreter application 201 with the reply information furnished by the server 304.

It should be noted that there are several points in the request and reply paths in FIGS. 2B and 3B that one component may perform the necessary processing to address a request directly to shorten the above procedures. For example, the redirector 306 shown in FIG. 3B may include a cache to store resource data often requested by the interpreter application 201. In such an embodiment, more than one request may be serviced by the redirector without having to access the service operating system. Also in FIG. 3B, when a client node obtains information about a resource, the redirector is bypassed and the request is forwarded to the server 304 by the network client process 321, network client libraries 320 and network driver 211 on the client.

Figure 4:
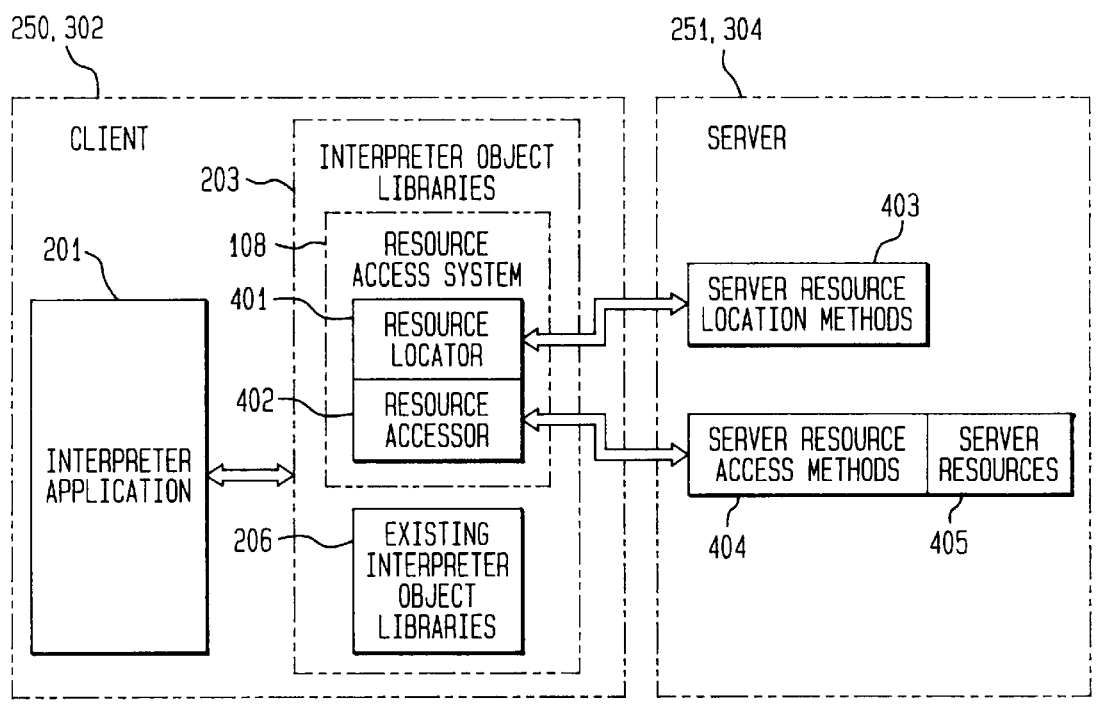
FIG. 4 is a block diagram of the present invention and its interfaces according to the first and second embodiments of the present invention.

FIG. 4 is a functional block diagram of a preferred embodiment of the resource access system 108 of the present invention. The representation illustrated in FIG. 4 is applicable to both of the embodiments described above with reference to FIGS. 2A and 3A.

As noted, the resource access system 108 provides interpreter applications 201 access to server resources such as those available through an installable file system. The resource access system is preferably an extension of the existing interpreter libraries 206, supplementing the standard application programming interface (API) provided by the interpreter 207. As noted, these server resources may be, for example, a file system 228 or print queue 229 located on the server node 251, 304. These server resources are represented by server resource 405 in FIG. 4. The server 251, 304 provides availability to well-known server resource location methods 403 to enable processes not located on the server to obtain information related to a server resource 405. The server 251, 304 also includes well-known server resource access methods 404, through which server resources 405 are accessed.

The resource access system 108 is generally comprised of an resource locator 401 and a resource accessor 402. The resource locator 401 interrogates the server node 251, 304 using currently available server resource location methods 403 to determine the location of a particular resource or retrieve other information relative to the resource 405. The resource accessor 402 accesses the server resource 405 in a well known manner through the server resource access methods 404 using information generated by the resource locator 401.

As noted, the resource access system 108 is preferably implemented as object libraries that supplement the existing interpreter I/O libraries 206. As implemented, the resource locator objects 401 and resource accessor objects 402 are used by an interpreter application 201 in place of the existing libraries 206 for purposes of accessing the server resource 405. Significantly, by extending by inheritance existing "generic" object libraries 206 with resource access system objects 108, an interpreter application 201 can use resource access system objects 108 interchangeably with the existing interpreter object libraries 206.

Specifically, the resource accessor 402 consists of stream objects that operate on a stream to access a desired resource. These resource accessor stream objects 402 inherit attributes from the existing interpreter stream objects 206 and can be substituted for the existing stream objects 206. Also, these stream objects use the server resource access methods 404 to obtain access to the server resource 405. That is, the resource accessor 402 performs I/O operations to the desired server resource 405, allowing access to the desired resource through a stream interface defined by the existing object libraries 206.

Significantly, the extension objects provide an interpreter application 201 access to network server resources to extend the functionality of the interpreter object libraries. The extension objects are also advantageous since the format of the extension objects are developed in the language of the interpreter, enabling them to be used on different types of client operating systems without additional programming.

In a preferred embodiment of the invention, the resource access system 108 is configured to provide a Java interpreter access to resources on a NetWare server. The resource access system 108 provides access to the resource 405 which would normally be provided by the NetWare client redirector. In this embodiment, the resource access system 108 provides access to NetWare files through the interface of the Java objects in the existing interpreter object libraries 206. Specifically, objects created in accordance with the present invention perform the functions required for accessing a NetWare file resource and extend existing Java service objects 206, 223, such as stream I/O objects.

The resource locator 401, either through existing network client libraries or distributed objects, executes currently existing server resource locations methods 403 to retrieve the appropriate information relative to the desired server resource 405. The appropriate information may be a file handle when the resource is a file. In the preferred embodiment noted above wherein a Java interpreter application accesses a NetWare server, the resource locator 401 includes objects that allow access to server resource location methods 403.

The resource accessor 402 accesses streams on the server through the stream interface, using client I/O stream objects/methods which use server resource access methods 404. In the case of files, the stream objects allow access to file contents on the server. Methods within stream objects contained in the resource accessor 402 communicate through server resource access methods 404 to perform stream functions such as input and output to the file resource 405 using information retrieved by the resource locator 401 through the server resource location methods 403. In the case of accessing a file conventionally through a redirector, this information could be a specific file handle, which allows the redirector to access the contents of a file residing on the server system. Once the file handle is obtained, the file resource 405 can be accessed through the stream interface.

When accessing a file resource on a NetWare server, the resource accessor 402 utilizes a NetWare-generated file handle to access a particular server resource 405 through the server resource access methods 404. The resource locator 401 executes server resource location methods 403 to obtain the proper NetWare file handle from the NetWare server and provides it to the resource accessor 402 through a specific interface.

Further features of the present invention, including the objects and methods that may be included in the resource locator 401 and resource accessor 402 in a preferred embodiment of the invention are described below with reference to FIGS. 5–7. As noted, the resource access system 108 provides access to server resources such as a file system 228 and a print queue 229. It is understood that other server resources are also made accessible by the resource access system 108. For example, when the server node 251 (and 304) is a NetWare™ server, many resources are available such as file, print queues, fax services, etc. Because the objects in the resource locator 401 and resource accessor 402 are to specifically configured to access specific resources, the following description is provided in the context of a Java interpreter application accessing a file system resource on a NetWare server.

Figure 5:
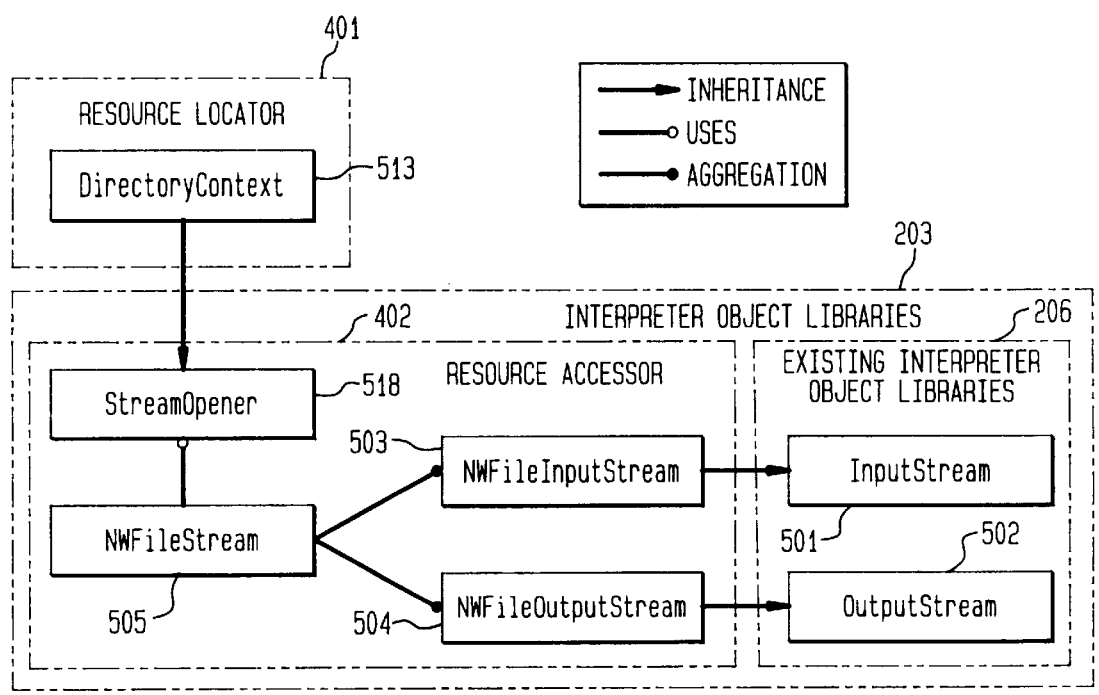
FIG. 5 is a block diagram illustrating the object classes of the first and second embodiments of the present invention.

FIG. 5 is a block diagram illustrating the objects included in the resource locator 401, resource accessor 402 and existing interpreter object libraries 206 to enable the Java interpreter application access the file system in the NetWare server. A legend is provided in FIG. 5 to assist in interpreting the relationships between the illustrated objects.

As is well known in the art, the solid arrow indicates that the object at the source of the arrow inherits the properties of the object at the point of the arrow. The line having a source end and an open circle at its destination end indicates that the object at the destination end uses the methods or features of the object at the source end. The line having a source end and a solid circle at its destination end indicates that the object at the destination end contains an aggregation of one or more of the objects at the source end.

In the illustrative example, the resource access system 108 provides access to NetWare files through standard interfaces defined in the existing interpreter object libraries 206. The resource locator objects 401 includes methods that allow access to NetWare-specific file information. The resource accessor objects 402 includes objects that enable the resource access system 108 to integrate NetWare files into Java streams and extend the functionality of the existing Java objects 206.

Prior to describing the above objects and methods in detail, further features of the NetWare file structure are discussed since, as noted, the configuration of the objects is resource-specific. When communicating with the file system of a NetWare server, there are specific features which are preferably taken into account. NetWare has files, directories, and volumes, and servers which can be represented as objects which are common to other types of server operating systems. However, some NetWare services are aware of a directory service referred to as NetWare Directory Services (NDS), available from Novell, Incorporated. NDS is a relational database which is distributed among NetWare server nodes. All servers can participate in the NDS, making all of the network resources available to NetWare clients. NDS provides global access to all resources (users, groups, printers, volumes, etc.) regardless of where the resources are physically located. Clients log into a multi server network and view the network as a single system. To effectively communicate with a resource which participates in this NDS, an object-based system of the present invention could model objects based upon the NDS system.

NetWare includes a naming system provider for providing naming functions relative to NDS objects such as files objects, directory objects, etc. This naming system provider includes naming objects which are well known in the art of NetWare programming. Specifically, these naming objects contain naming information relative to server resources 405, which in NetWare, are represented as objects such as file objects and print queue objects.

NetWare also provides access to server resources 405 through streams using server resource access methods 404. There are two different types of streams. There are input streams for inputting stream information from a server resource 405 and output streams for outputting information to a server resource 405. In order to access a stream it must first be opened. When opening an input stream, an object used to open the stream will first check to ensure that a resource exists, and if so, the resource is opened. If the resource does not exist, then an error is generated. When an output stream is opened and the stream does not exist, the object used to open the output stream must create it.

Objects are provided access to the stream interface to transferring information. For example, when the server resource is a file, a directory object can be used to open a stream since all files must be stored in a directory. Thus, given a directory object and the name of a stream, a file specified by the stream name can be opened. If the file does not exist, and the stream that is opened is an output stream, a new file will be created with the specified name.

As is well known, directory objects are not the only types of NDS objects which use streams. For example, a queue job manager object could open a stream which references the contents of a specified queue job. Also, an NDS object could open a stream which references the contents of a named NDS attribute.

Since object-oriented programming is used, an object that provides an interface to the streams is desired. Consequently, objects which require access to streams may use stream interface object methods to achieve such access.

In the exemplary embodiment illustrated in FIG. 5, the resource access system 108 provides access to NetWare server files through the existing Java objects in the existing libraries 206. Specifically, the existing interpreter object libraries 206 include two stream objects: InputStream 501 stream object for performing well-known functions related to the input of a stream and OutputStream 502 stream object for performing well-known functions related to the output of a stream. As noted, these and other objects of the existing interpreter object libraries 206 are part of the publicly available java.io library package available from Sun Microsystems. The java.io package provides these and other input/output stream objects for reading and writing data to files as well as other input and output devices. As is well known in the art, Java streams are byte-oriented and the object classes defined in the java.io package can be combined to implement sophisticated stream functionality. Detailed information concerning Java object classes can be obtained by the Java Development Kit (JDK) Specification Version 1.0.2, which defines the Java programming language, and which is incorporated herein by reference in its entirety.

The resource access system 108 includes two types of objects pertinent to the exemplary application. The resource locator 401 contains objects that retrieve the file handle for the particular file. The resource accessor 402 contains NetWare stream objects that operate on a device accessor to access the resource itself. The resource accessor 402 accomplishes this by using existing server resource access methods 404 to operate on the file using the file handle obtained from the resource locator 401.

The resource accessor 402 objects integrate NetWare files into Java streams and extend the functionality of the existing Java objects InputStream 501 and OutputStream 502. These resource accessor objects 402 allow an NWInputStream object 503 or an NWOutputStream object 504 to be used interchangeably with the related Java stream objects.

The resource accessor 402 consists of DeviceAccessor object 505, NWInputStream object 503, NWOutputStream object 504, and StreamOpener 518. These objects enable the resource accessor 402 to operate on NetWare file streams. The DeviceAccessor object 505 provides methods for accessing resource contents in a platform-independent manner. As shown in FIG. 5, the DeviceAccessor object 505 is used by the NWInputStream 503 and NWOutputStream 504 objects. The NWInputStream object 503 implements methods that enable it to function as a Java file input stream object, The NWInputStream object 503 contains file input methods that provide read-only access to a NetWare data stream for reading the contents of a NetWare file. Likewise, the NWOutputStream object 504 implements all methods necessary to function as a Java file output stream object, containing only file output methods. The StreamOpener object 518 provides an interface to the NetWare server, through which, the file handle is obtained.

The resource locator 401 includes objects that allow access to NetWare-specific file system features. Specifically, the resource locator 401 includes an DirectoryContext object 513. The DirectoryContext object 513 retrieves information from naming objects which contain the information about the particular resource 405 in a well-known manner.

The DeviceAccessor object 505 provides a central repository for the code required to read and write to a NetWare file. Specifically, the DeviceAccessor object 505 contains the private implementations of the methods contained in the NWInputStream 503 and NWOutputStream 504 objects. Therefore, objects 503–504 are public objects which define the interface or contract to the private methods contained in the DeviceAccessor object 505.

The DeviceAccessor object 505 provides platform-independent implementations for calling the redirector 306. If a class that implements DeviceAccessor 505 is platform-dependent, then there needs to be a section of code in every class that implements StreamOpener 518 that will return this platform-dependent type of DeviceAccessor 505 to ensure that the platform is correct for the specific DeviceAccessor 505.

The NWInputStream object 503 includes methods similar in function and name to the FileInputStream object in the existing object libraries 206 of Java and described in the JDK specification. In particular, these methods replace methods which are available in the InputStream 501 and OutputStream 502 objects from which the resource accessor 402 objects inherit as shown in FIG. 5. Although the method contracts (i.e., interface) of these new methods are similar to the existing Java methods, in accordance with the present invention, the underlying stream operations which are performed by these methods operate with NetWare stream functions.

Figure 6:
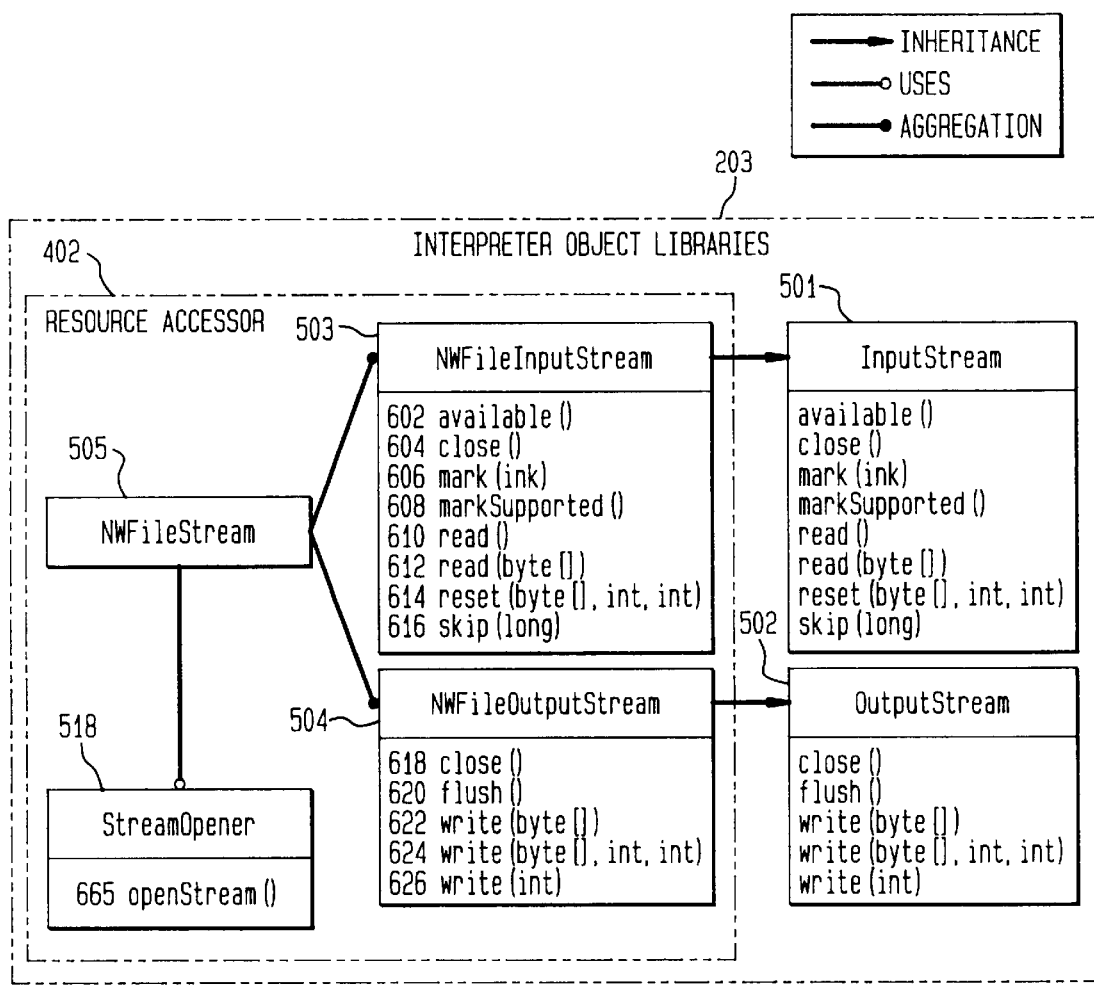
FIG. 6 is a class diagram of the objects and methods of the object classes according to the first and second embodiments of the present invention.

FIG. 6 is a block diagram illustrating the methods implemented in each of the objects in the resource accessor 402 illustrated in FIG. 4. These methods include an available method 602 that replaces the available method of InputStream 501. The available method 602 returns an integer corresponding to the next caller of a method for the input stream being accessed. The close method 604 closes an input stream. The general contract of the mark method 506 is that, if the markSupported method 608 returns a value of true, the object stream records all the bytes read after the call to the mark method 606 and stands ready to supply the recorded bytes again if the reset method 610 is called. However, the stream is not required to remember any data at all if more than a limit of bytes are read from the stream before the reset method 614 is called. The general contract of the markSupported method 608 is that if it returns true, then the stream supports the mark and reset methods 606, 614.

For any given instance of the InputStream object 501, the markSupported method 608 consistently returns the same value whenever it is called. The markSupported method 608 for class InputStream 501 always returns false. The general contract of the reset method 614 is, if the markSupported method 608 returns a true value, then, if the mark method 606 has not been called since the stream was created, or the number of bytes read from the stream since the mark method 606 was last called is larger than the argument to mark at that last call, then an I/O exception (or error) might be raised. If such an I/O exception is not raised, then the stream is reset to a state such that all the bytes read since the most recent call to the mark method 606 (or since the start of the file, if mark has not been called) will be resupplied to subsequent callers of the read method 612, followed by any bytes that otherwise would have been the next input data as of the time of the call to reset. If the markSupported method 608 returns a false value, then: The call to reset may raise an I/O exception. If an I/O exception is not raised, then the stream is reset to a fixed state that depends on the particular type of the input stream and how it was created. The bytes that Will be supplied to subsequent callers of the read method 612 depend on the particular type of the input stream. The reset method 614 for class InputStream always throws an I/O exception. Bytes for this operation are read from the actual file with which this file input stream is connected. An NWInputStream object 503 uses the finalize method to clean up the connection to the actual file.

The NWOutputStream object 504 includes methods similar in function and name to the OutputStream object in the existing object libraries 206 of Java. These methods include the close method 618, which closes the file output stream, and thus the file output stream may no longer be used for writing bytes. The close method 618 overrides the close method of OutputStream 502. The write methods 622, 634, and 626 writes bytes or integers to the actual file-to which this file output stream is connected and overrides the write method of OutputStream 502. A NWOutputStream object 504 uses the finalization method to clean up the connection to the actual file.

The StreamOpener object 518 provides a stream interface to the NetWare server for retrieving the file handle for the file resource to be accessed. Resource locator objects such as DirectoryContext 513 implement a method of the StreamOpener object 518 to allow a DeviceAccessor object 505 to be returned. It is through this stream interface that any object can appear as a StreamOpener object 518. It is necessary for an object to be a StreamOpener object 518 because the NWInputStream object 503 and NWOutputStream object 504 require an object of type StreamOpener.

The StreamOpener object 518 interface is the preferred stream interface for accessing a server resource 405. There is one method in the StreamOpener object 518, the openStream method 665, that provides access to the stream interface. Thus, for any stream object to construct itself, it must be supplied an object that implements the StreamOpener object 518 interface, the name of the stream, and flag information. The stream would then call the openStream method 665 of the object that implemented the StreamOpener interface using the name and flag information to open the stream.

Figure 7:
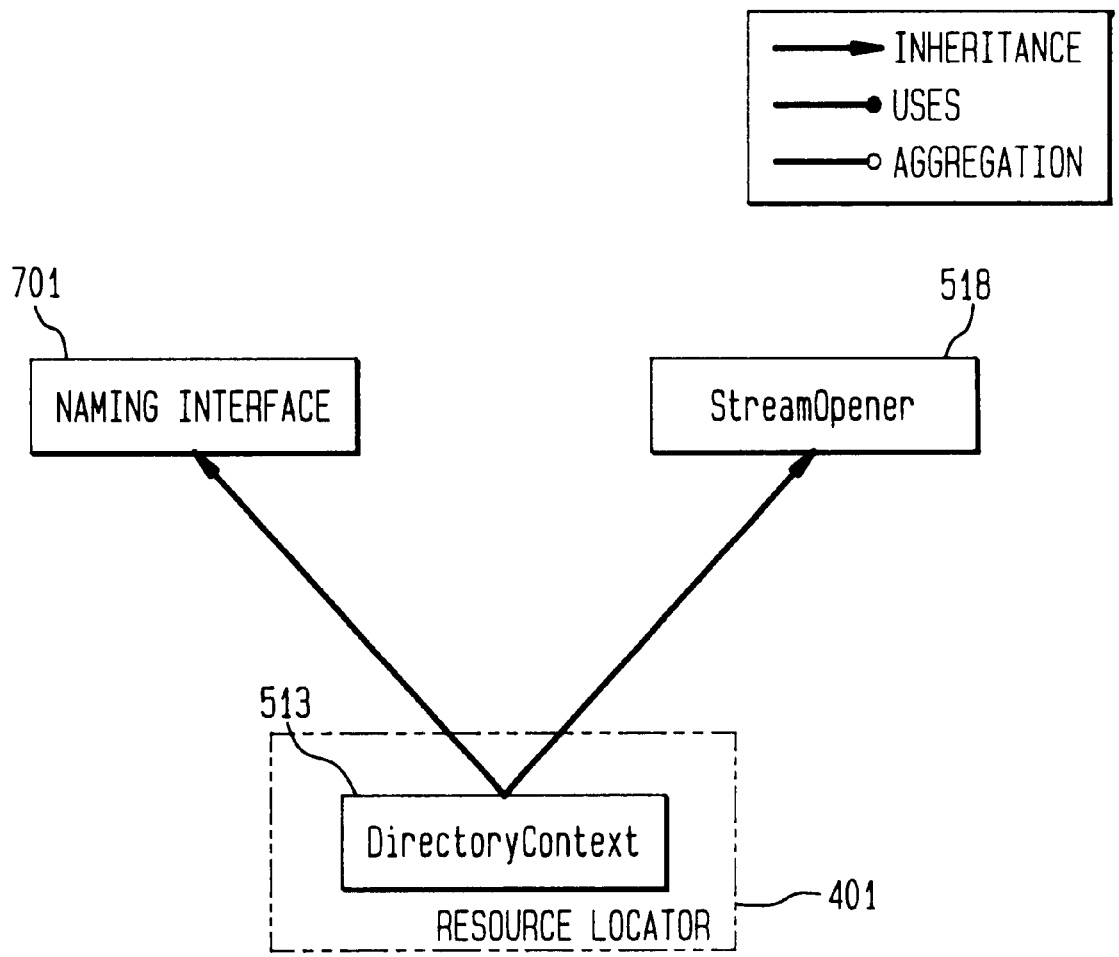
FIG. 7 is a class diagram of the objects of the object classes according to the first and second embodiments of the invention.

FIG. 7 is a block diagram illustrating the relationship of the resource locator to other objects as illustrated in FIG. 5. The resource locator generally obtains information from a naming interface defined by the aforementioned naming objects and the StreamOpener object 518.

The DirectoryContext object 513 obtains location information related to the resource 405. Specifically, in the case of a file resource, the DirectoryContext object stores the complete path to the directory where the file is located. For instance, associated with a file on a directory located at a path of C:\MyFiles\Backup, a DirectoryContext object may have a information in a string "C:\MyFiles\Backup" which references the directory location of the file. Consequently, the DirectoryContext object 513 provides naming information to other objects, such as file stream objects, which require naming information for a server resource 405.

Having now described several embodiments of the invention, numerous modifications and other embodiments are within the scope of one of ordinary skill in the art. For example, the client may also have server-like features available, such as the ability to share local resources on the client respond to resource requests from other clients. Also, other resources which are available on the server such as print queues can be made available to the interpreter client applications. Also, other types of interpreters and their applications, such as Smalltalk can benefit from additional functionality presented by this invention.

It should be understood that these methods are one particular way in which the present invention can be realized. Other objects having different structure and methods could be used to perform these functions.

While various embodiments of the present invention have been described above, it should be understood that they have been presented by way of example only, and not limitation. Thus, the breadth and the scope of the present invention are not limited by any of the above exemplary embodiments, but are defined only in accordance with the following claims and their equivalents.

What is claimed is:

1. An interpreter system for use in a network having a client node with an interpreter application and a server node with a resource, the interpreter system comprising:

an interpreter engine for translating the interpreter application to system-level instructions appropriate for an operating system on the client node; and an interpreter library for providing the interpreter application access to server resources that require access to be performed through an installable file system on the client node, wherein the interpreter library defines an application programming interface that is configured to perform functions utilized by the interpreter application to access resources, wherein said interpreter library includes a resource access system comprising:

a resource locator residing on the client node and being configured to interrogate the server node to obtain from the server node access information related to the resource; and a resource accessor residing on the client node and being configured to create an object based on the access information obtained by the resource locator that can utilize methods existing on the server node to access the resource, wherein the created object includes a stream object that is configured to access the server resource using the access information provided by the resource locator to allow a server stream object to be used interchangeably with a related application stream object.

2. The interpreter system of claim 1, wherein said resource locator and said resource accessor are implemented as object-oriented libraries that supplement said interpreter library.

3. The interpreter system of claim 1, wherein the resource locator and resource accessor are implemented in the same programming language as the interpreter.

4. The interpreter system of claim 1, wherein said resource access system resides on the client node and a second resource access system resides on the server node.

5. The interpreter system of claim 4, wherein resource access requests generated by the interpreter application are transferred between said resource access system and said second resource access system using distributed object technology.

6. The interpreter system of claim 1, wherein the client node further includes a redirector for accessing the resource, said redirector configured to format requests from the resource access system and forward the requests to the server node.

7. A resource access system for use in an interpreter system residing in a client node with an interpreter application, the client node connected to a network with a server node having server resources, the resource access system comprising:

a resource locator residing on the client node and being configured to interrogate the server node to obtain from the server node access information related to a resource; and a resource accessor residing on the client node and being configured to create an object based on the access information obtained by the resource locator that can utilize methods existing on the server node to access the resource, wherein the created object comprises a stream object configured to access the server resource using the access information provided by the resource locator to allow a server stream object to be used interchangeably with a related application stream object.

8. The interpreter system of claim 7, wherein said resource locator and said resource accessor are implemented as object-oriented libraries that supplement an interpreter library.

9. The interpreter system of claim 7, wherein the resource locator and the resource accessor are implemented in the same programming language as the interpreter system.

10. A controller for enabling a processor to access server resources on a server computer system through an interpreter application, said controller comprising:

information access means for accessing the server resources from a client to derive access information from the server; and resource access means for using said access information to create an object that can utilize methods existing on the server to access a particular server resource residing on the server, wherein the created object comprises an object configured to access the server resource using the access information provided by the information access means to allow a server object to be used interchangeably with a related application object.

11. A computer program product comprising a computer readable medium having computer program logic recorded thereon for enabling a processor in a client computer system to access resources on a server computer system through an interpreter application, said computer program product comprising:

information access means for accessing the server resources from the client to derive access information from the server; and resource access means for using said access information to create an object that can utilize methods existing on the server to access a particular server resource residing on the server, wherein the created object comprises an object configured to access the server resource using the access information provided by the information access means to allow a server object to be used interchangeably with a related application object.

12. A method for providing an interpreter application on a client node access to a resource associated with a server node connected to the client node through a network, the method comprising the steps of:

interrogating the server node to obtain access information related to the resource; and based on the obtained access information, creating an object on the client node that can utilize methods existing on the server node to access the resource, such that the created object allows the interpreter application on the client node to access the server resource without having to install a redirector in the client node.

13. The method of claim 12, wherein the step of interrogating the server node to obtain access information related to the resource comprises interrogating the server node to obtain the access information using resource location methods existing on the server node.

14. The interpreter system of claim 1, wherein the resource locator is configured to interrogate the server node to obtain the access information using resource location methods existing on the server node.

15. The interpreter system of claim 7, wherein the resource locator is configured to interrogate the server node to obtain the access information using resource location methods existing on the server node.

* * * * *